Patented Oct. 5, 1954

2,691,012

UNITED STATES PATENT OFFICE 2,691,012

SYNTHESIS OF GLUCOTHIOFURANOSIDES

Melville L. Wolfrom, Columbus, Ohio, and Stephen M. Olin, Elkhart, Ind., assignors to The Ohio State University Research Foundation, Columbus, Ohio, a corporation of Ohio No Drawing. Application March 15, 1952,
Serial No. 276,878

3 Claims. (Cl. 260—211)

This invention is a continuation-in-part of my copending application, U. S. Serial Number 88,499, filed April 19, 1949, now Patent No. 2,590,831.

This invention relates generally to the antibiotic streptomycin and more particularly to valuable intermediate compounds in the production of 1,3-diamino-2,4,5,6-tetrahydroxy-cyclohexane, hereinafter referred to as streptamine.

The streptomycin molecule has been shown to consist of a disaccharide of N-methyl-L-glucosamino-L-streptose linked glycosidically with a diguanidino-inositol, designated streptidine, and is believed to have the following structural formula:

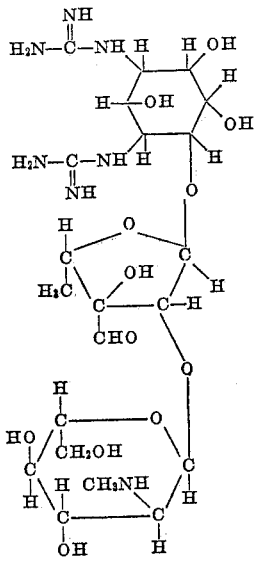

Thus it is seen that the molecule of the antibiotic streptomycin consists of three moieties, N-methyl - glucosamine, 3 - C - formyl - 5 - desoxy - L-aldopentofuranoside and a meso-diguanidino-inositol.

Streptidine was first isolated by the acid hydrolysis of streptomycin hydrochloride as the crystalline sulfate and picrate. (Science, 103, 53 (1946).)

Strong alkaline hydrolysis of streptidine would yield four moles of ammonia and two moles of carbon dioxide with the production of a compound having the following formula:

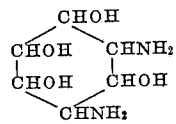

This compound 1,3-diamino-2,4,5,6-tetrahydroxy-cyclohexane will hereinafter be designated streptamine (J. Fried, G. A. Boyack and O. Wintersteiner, J. Biol. Chem., 162, 391 (1946)). Streptamine forms a hexaacetate which crystallizes in two forms: a chloroform-insoluble fraction crystallizing in long needles, of M. P. 343–345° with a characteristic transition point at 250° to longer needles, and a chloroform-soluble fraction which possesses the same characteristic transition point and melting point as the chloroform-insoluble form. (R. L. Peck, C. E. Hoffman, Jr., Elizabeth W. Peel, R. P. Graber, F. W. Holly, R. Mozingo and K. Folkers, J. Am. Chem. Soc. 68, 776 (1946)).

The present invention involves certain intermediate compounds in the preparation of streptamine which comprises the following steps.

1. Reacting N-acetyl-D-glucosamine with ethyl mercaptan to yield crude N-acetyl-D-glucosamine diethyl thioacetal. This may be purified by the preparation of pentaacetyl-D-glucosamine diethyl thioacetal, chromotographic separation, and subsequent de-O-acetylation, to yield a pure N-acetyl-D-glucosamine diethyl thioacetal.

2. Reacting N-acetyl-D-glucosamine diethyl thioacetal with water in the presence of mercuric chloride and mercuric oxide, to yield ethyl 2-acetamido-2-desoxy-α-D-glucothiofuranoside.

3. Reacting ethyl 2-acetamido-2-desoxy-α-D-glucothiofuranoside with lead tetraacetate, and treatment of the resulting product with nitromethane, neutralizing and crystallizing the product, a mixture of ethyl 2-acetamido-2,6-didesoxy-6 - nitro - α - D - glucothiofuranoside and ethyl 2 - acetamido - 2,6 - didesoxy - 6 - nitro - β - L-idothiofuranoside. These products are then separated and the higher melting form is demercaptalated and condensed intramolecularly, acidified, hydrogenated, then acetylated to streptamine hexaacetate.

4. Streptamine hexaacetate is converted to streptamine by hydrolysis.

The following equations will serve to graphically illustrate the above process:

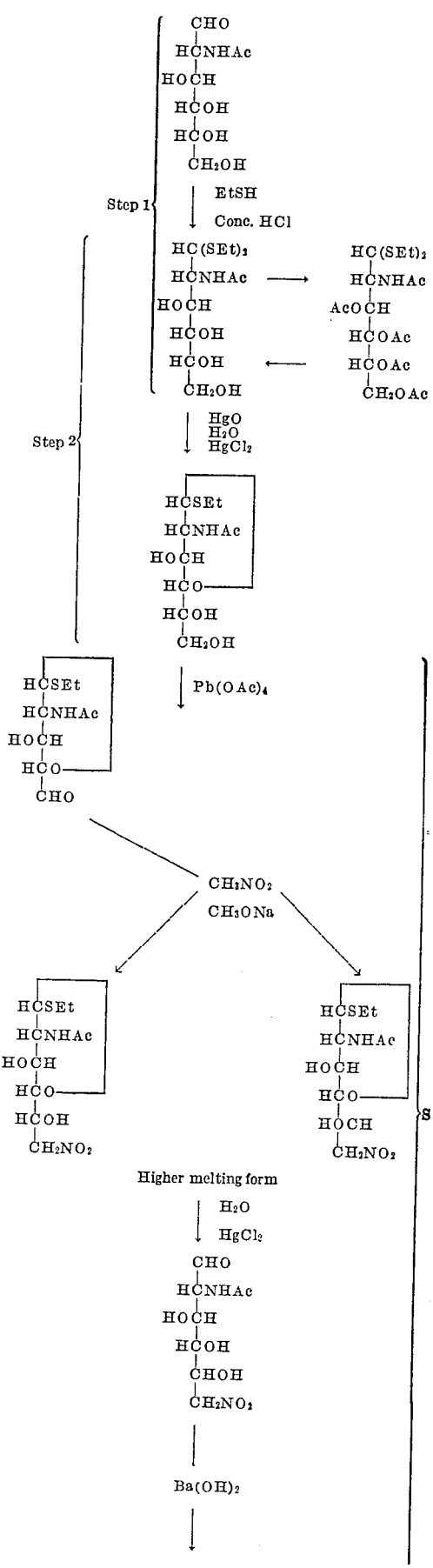
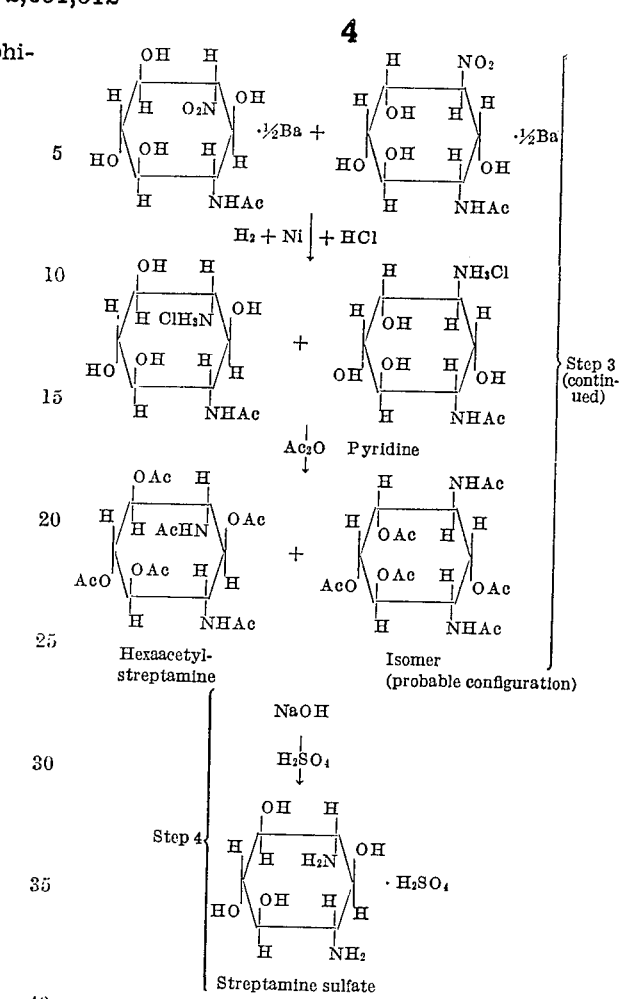

Hexaacetyl-streptamine

Isomer (probable configuration)

Streptamine sulfate

The following examples will serve to more fully illustrate the present invention; all parts being by weight, and all temperatures being by centigrade unless otherwise indicated.

EXAMPLE 1

*The preparation of ethyl 2-amino-2-desoxytetra-acetyl-α-D-glucothiofuranoside*

Yellow mercuric oxide was prepared from mercuric chloride (5 g.) and sodium hydroxide (2 g.) according to the method of Pascu and Wilson. N-acetyl-D-glucosamine diethyl thioacetal (4.65 g. in 60 cc. of water) and the washed oxide suspension were combined. Mercuric chloride (2.01 g.) dissolved in water (150 cc.) was added dropwise over a period of twenty minutes under vigorous mechanical stirring. At the end of the addition the reaction mixture was stirred for fifteen minutes. Pyridine (3 cc.) was added and the solution was filtered through a precoat of celite. The filtrate was concentrated at reduced pressure. The resulting sirup was acetylated by dissolving in pyridine (60 cc.) and then adding acetic anhydride (60 cc.). The acetylation mixture was allowed to stand at room temperature for eighteen hours and then poured into ice water. The aqueous solution was extracted with four portions of chloroform (75 cc.). The extract was washed with water, saturated aqueous sodium bicarbonate solution and finally with water. The dried chloroform solution was concentrated to a thin sirup and taken up in absolute ethanol. The solvents were removed at reduced pressure whereupon the concentrate crystallized; M. P. 80–90° Recrystallization from aqueous ethanol yielded a compound (2.51 g.) of M. P. 119–122°, spec. rot. +123° (c. 4, chloroform, D-line, 23°). Two subsequent recrystallizations yielded a product of M. P. 124.5–125.5°, spec. rot. +140° (c. 4, chloroform, D-line, 23°). Further recrystallizations did not alter these constants.

*Analysis.*—Calculated for $C_{16}H_{25}O_8NS$:

|   | Calculated | Found |
|---|---|---|
| C | 49.09 | 49.22 |
| H | 6.44 | 6.72 |
| N | 3.58 | 3.77 |
| S | 8.19 | 8.03 |

Deacetylation of ethyl 2-amino-2-desoxytetraacetyl-α-D-glucothiofuranoside (88 mg.) yielded a compound (25 mg., 45% of the theoretical) which was identical with ethyl 2-acetamido-2-desoxy-α-D-glucothiofuranoside of M. P. 119–121°, spec. rot. +170° (c. 4, water, D-line, 22°), as determined by physical constants and mixed melting point.

EXAMPLE 2

*The preparation of ethyl 2-amino-2-desoxytetraacetyl-beta-D-glucothiofuranoside*

The mother liquors from the crystallization of ethyl 2 - amino - 2 - desoxytetraacetyl - α - D-glucothiofuranoside were concentrated to a sirup and chromatographed on Magnesol. Elution of the lower zone with acetone yielded a compound of M. P. 179–180°, spec. rot. —42.4° (c. 2, chloroform, D-line, 22°). Further recrystallizations from ethanol water did not alter these constants.

*Analysis.*—Calculated for $C_{16}H_{25}O_8NS$: C, 49.09; H, 6.44; N, 3.58; S, 8.19. Found: C, 49.21; H, 6.59; N, 3.46; S, 8.10.

EXAMPLE 3

*The preparation of ethyl 2-acetamido-2,6-didesoxy - 6 - nitro - alpha - D - glucothiofuranoside and ethyl 2 - acetamido - 2,6 - didesoxy - 6 - nitro-beta-L-idothiofuranoside*

Ethyl 2-acetamido-2-desoxytriacetyl-α-D-glucothiofuranoside (also called ethyl 2-amino-2-desoxy - tetraacetyl - α - D - glucothiofuranoside) (2.51 g.) was dissolved in absolute methanol (100 cc.) and cooled to —10°. Anhydrous ammonia was passed into the solution for thirty minutes at a rate which maintained the temperature between —5° and 0°. The deacetylation mixture was then allowed to stand at room temperature for ninety minutes. The solvent was removed at reduced pressure and the resulting sirup was dissolved in methanol (3 cc.) and chloroform (50 cc.). Lead tetraacetate (4.43 g.) in chloroform (100 cc.) was added and the reaction mixture warmed to 50–55°. After fifteen minutes the slight remaining color was removed by the addition of ethylene glycol (one drop). The chloroform solution was cooled in an ice bath and the lead diacetate was removed by filtration. The chloroform solution was extracted six times with cold water in 2 cc. portions. The water extracts were extracted with chloroform. The chloroform solutions were dried and concentrated at reduced pressure. The resulting sirup was taken up in 20 cc. of 95% ethanol and nitromethane (10 cc.). The solution was made basic to litmus with 2 N sodium methylate (5 cc.) and the reaction mixture was allowed to stand in the ice box for eighteen hours. The solution was concentrated at reduced pressure to a thin sirup and chloroform (150 cc.) was added. The solution was concentrated under reduced pressure to 100 cc. and extracted with cold water.

The dried chloroform solution was concentrated under reduced pressure to a yellow crystalline residue (0.45 g.). The isomers were separated coarsely by fractional crystallization from methanol, chloroform and n-butyl ether; however, the method was wasteful. An efficient separation was made by chromatographing the mixture on Magnesol which had been washed with 6 N hydrochloric acid. The top zone yielded a compound of M. P. 114–115°, spec. rot. +160° (c. 2, methanol, D-line, 18°).

*Analysis.*—Calculated for $C_{10}H_{18}O_6N_2S$:

|   | Calculated | Found |
|---|---|---|
| C | 40.80 | 40.48 |
| H | 6.16 | 6.26 |
| N | 9.52 | 9.23 |

The lower zone yielded a compound of M. P. 190–193° (with decomposition).

*Analysis.*—Calculated for $C_{10}H_{18}O_6N_2S$:

|   | Calculated | Found | |
|---|---|---|---|
| C | 40.80 | 40.64 | 40.59 |
| H | 6.16 | 5.78 | 5.99 |
| N | 9.52 | 9.48 | 9.45 |

EXAMPLE 4

*The preparation of streptamine hexaacetate*

The high melting form (M. P. 190–193°) (with decomposition) from the preparation of the ethyl 2 - acetamido - 2,6 - didesoxy - 6 - nitro - α - hexothiofuranoside was used in the initial preparation of streptamine hexaacetate. One hundred sixty-five milligrams of this compound was dissolved in warm water (40 cc.) and mercuric chloride (150 mg.) in water (10 cc.) was added. The reaction mixture was allowed to stand at room temperature for two hours. The mercury mercapto chloride was removed by filtration. Silver acetate (200 mg.) was added to the filtrate and the reaction mixture was kept at room temperature overnight. After the silver chloride and excess silver acetate were removed by filtration, hydrogen sulfide was passed into the filtrate. The sulfides were removed by filtration and the filtrate blown to a clear sirup. All efforts to obtain a crystalline material from this sirup failed. Eighty milligrams of the above sirup was dissolved in water (1 cc.) and 1.60 cc. of barium hydroxide (0.194 N) was added. On standing twenty-four hours at room temperature the solution turned straw colored. Absolute ethanol (10 cc.) was added and a highly colored flocculent precipitate was removed by filtration. The solvent was removed in a stream of air and efforts to obtain a crystalline barium salt failed. Fifty milligrams of the barium salt was dissolved in 0.1 N hydrochloric acid (4 cc.) and combined with Raney nickel catalyst (200 mg.) in water (30 cc.). The solution was hydrogenated at room temperature under one atmosphere pressure. The catalyst was removed at the centrifuge and washed with ethanol. The supernatant liquid and washings were blown to dryness and acetylated in acetic anhydride-pyridine mixture (3 cc. of 2:1) under gentle reflux for one hour. The reaction mixture was blown to dryness and extracted with warm chloroform. The residue from the chloroform extraction was treated with warm absolute ethanol. The absolute ethanol solution was filtered and placed in the ice box; after twelve hours 4 mg. of needle clusters had formed. The needles were removed by filtration and X-ray diffraction pattern was taken of this material. This compound was shown to be identical with streptamine hexaacetate on the basis of this evidence. The compound also possessed a similar transition point and melting point as streptamine hexaacetate prepared from the degradation product of streptomycin; transition point 245–250°, M. P. 345–348° (in sealed capillary). The chloroform solution was blown to dryness and elongated prisms formed which were insoluble in cold chloroform. The compound was removed from the chloroform solution by filtration, yield 5 mg. of M. P. 350–355° with decomposition. A powder X-ray diffraction pattern was taken of this material. It was shown on this evidence to be neither the chloroform soluble or chloroform insoluble crystalline form of streptamine hexaacetate.

X-RAY DIFFRACTION PATTERNS

| Streptamine Hexaacetate from Streptomycin | | Streptamine Hexaacetate from D-Glucosamine | |
|---|---|---|---|
| Interplanar Spacing, Å. | Relative Intensity | Interplanar Spacing, Å. | Relative Intensity |
| 7.09 | 0.7 | 7.05 | 0.6 |
| 4.55 | 1.0 | 4.54 | 1.0 |
| 3.94 | 0.7 | 3.94 | 0.8 |
| 3.54 | 0.4 | 3.54 | 0.5 |
| 3.28 | 0.5 | 3.28 | 0.5 |
| 3.09 | 0.2 | 3.09 | 0.2 |
| 2.87 | 0.1 | 2.87 | 0.1 |
| 2.57 | 0.2 | 2.57 | 0.2 |
| 2.38 | 0.2 | 2.38 | 0.1 |
| 1.88 | 0.2 | 1.88 | 0.2 |
| 1.77 | 0.05 | 1.77 | 0.05 |

It is to be understood that the above particular description is by way of illustration, and that changes, omissions, additions, substitutions and/or modifications may be made without departing from the spirit of the invention.

We claim:
1. A compound of the class consisting of ethyl 2 - amino - 2 - desoxytetraacetyl - α - D - glucothiofuranoside, and ethyl 2-amino-2-desoxytetraacetyl-β-D-glucothiofuranoside.

2. Ethyl 2 - amino - 2 - desoxytetraacetyl - α-D-glucothiofuranoside having the formula

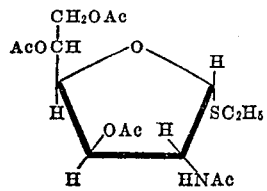

wherein Ac represents

3. Ethyl 2 - amino - 2 - desoxytetraacetyl - β-D-glucothiofuranoside having the formula

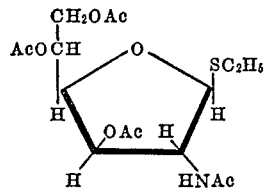

wherein Ac represents

References Cited in the file of this patent
UNITED STATES PATENTS

| Number | Name | Date |
|---|---|---|
| 2,557,560 | Peck | June 19, 1951 |
| 2,590,831 | Wolfrom et al. | Mar. 25, 1952 |